(12) United States Patent
Miyata (10) Patent No.: US 7,551,417 B2
(45) Date of Patent: Jun. 23, 2009

(54) THIN FILM CIRCUIT SUBSTRATE, PIEZOELECTRIC SPEAKER DEVICE, DISPLAY DEVICE, AND SOUND-GENERATING DISPLAY DEVICE

(75) Inventor: Kazuhiko Miyata, Usui Habikino (JP)

(73) Assignee: Sharp Kabushiki Kaisha, Osaka (JP)

( * ) Notice: Subject to any disclaimer, the term of this patent is extended or adjusted under 35 U.S.C. 154(b) by 156 days.

(21) Appl. No.: 11/105,690

(22) Filed: Apr. 14, 2005

(65) Prior Publication Data

US 2005/0237685 A1 Oct. 27, 2005

(30) Foreign Application Priority Data

Apr. 22, 2004 (JP) ............... 2004-127020

(51) Int. Cl.
*H02H 3/20* (2006.01)
*H02H 9/04* (2006.01)

(52) U.S. Cl. .................... 361/91.5; 361/91.1

(58) Field of Classification Search .......... 361/91.1, 361/91.5
See application file for complete search history.

(56) References Cited

U.S. PATENT DOCUMENTS

| 4,481,521 | A | * | 11/1984 | Okumura | 257/360 |
|---|---|---|---|---|---|
| 5,596,474 | A | | 1/1997 | Wada et al. | |
| 5,657,139 | A | | 8/1997 | Hayashi | |
| 5,900,854 | A | * | 5/1999 | Itoh et al. | 345/99 |
| 5,985,700 | A | * | 11/1999 | Moore | 438/149 |
| 6,144,217 | A | * | 11/2000 | Iwata et al. | 326/27 |
| 6,335,535 | B1 | | 1/2002 | Miyake et al. | |
| 6,355,875 | B1 | * | 3/2002 | Kamimura | 136/256 |
| 6,445,427 | B1 | * | 9/2002 | Lee et al. | 349/40 |
| 6,495,890 | B1 | * | 12/2002 | Ono | 257/387 |

(Continued)

FOREIGN PATENT DOCUMENTS

| JP | 10-050937 | | 2/1998 |
|---|---|---|---|
| JP | 2002-083968 | A | 3/2002 |
| JP | 2002-110923 | A | 4/2002 |
| JP | 2002-369290 | A | 12/2002 |
| JP | 2003-244784 | | 8/2003 |
| JP | 2003-273228 | A | 9/2003 |

OTHER PUBLICATIONS

Fukuretsu Ri, Yasushi Kubota, Shigeki Imai, Kiyoshi Katou, Yoshimoto Kurokawa, and Jun Koyama, "Forming a 3-MHz-operated MPU on a Glass Substrate, Checking on the future potential of the system liquid crystal," Feb. 17, 2003, pp. 123-130. (including partial English translation).

*Primary Examiner*—Stephen W Jackson
*Assistant Examiner*—Lucy Thomas
(74) *Attorney, Agent, or Firm*—Keating & Bennett, LLP (57) ABSTRACT

A thin film circuit substrate is provided with a voice-output-section driving section, formed of a thin film layer on an insulative substrate, for driving a voice output section. An antisurge section, provided on a wiring between the voice-output-section driving section and an output terminal section thereof, includes an antisurge element. When a surge voltage is applied to the wiring, the antisurge element, monolithically formed on the thin film circuit substrate, connects the wiring to the ground so as to pass a current (surge current), generated by the surge voltage applied to the wiring, to the ground. This makes it possible to provide a thin film circuit substrate which is monolithically provided with a function which can protect a circuit section when a voltage exceeding a predetermined range is applied to the wiring linking the circuit section with an input terminal section or an output terminal section.

20 Claims, 8 Drawing Sheets

U.S. PATENT DOCUMENTS 6,740,596 B2 * 5/2004 Hayase et al. ............... 438/706
6,891,196 B2 * 5/2005 Tanaka et al. ................ 257/72
2001/0034093 A1 * 10/2001 Matsuzaki et al. .......... 438/199
2005/0105747 A1 5/2005 Miyata et al.

* cited by examiner

THIN FILM CIRCUIT SUBSTRATE, PIEZOELECTRIC SPEAKER DEVICE, DISPLAY DEVICE, AND SOUND-GENERATING DISPLAY DEVICE

This Nonprovisional application claims priority under 35 U.S.C. §119(a) on Patent Application No. 127020/2004 filed in Japan on Apr. 22, 2004, the entire contents of which are hereby incorporated by reference.

FIELD OF THE INVENTION

The present invention relates to a thin film circuit substrate including a circuit section, such as a drive circuit, constituted of a thin film layer formed on an insulative substrate, such as a glass substrate, and a piezoelectric speaker device and a display device provided with the same.

BACKGROUND OF THE INVENTION

Conventionally, a piezoelectric speaker device has been used which outputs a voice by causing an excitation source section constituted of an piezoelectric element to vibrate a vibration section (e.g., a diaphragm) based on an audio signal. In addition, a compact, lightweight, thin display element has appeared recently. There has been commercialized a portable display device, with such a display element, capable of capturing an image from an external device so as to display the picture. It is desired that such a portable display device be reduced in size to a card as small as a normal credit card or a business card.

For example, Japanese Laid-Open Patent Application No. 244784/2003 (Tokukai 2003-244784; published on Aug. 29, 2003) (Document 1) discloses a speaker-function containing display device which realizes to reduce its size to a size of a card. According to this arrangement, the display device realizes a speaker function of generating a sound without upsizing in such a manner that a vibration section, a substrate constituting a display element based on an audio signal inputted from an external device, is vibrated by an excitation source section constituted of a piezoelectric element.

Recently, in such a piezoelectric speaker and a portable display device, a voice-output-section drive circuit for driving a voice output section based on an audio signal, and a display-section drive circuit for causing a display section to display an image based on a video signal, have been formed of a thin film layer including a polycrystalline silicon thin film formed on an insulative substrate (e.g., a glass substrate), thereby constituting a thin film circuit substrate. Such a thin film circuit substrate is disclosed in Document 1 as well.

Conventionally, a drive circuit in a piezoelectric speaker device and in a display device has been realized by bonding an integrated circuit (IC) on a printed board. Meanwhile, as described above, the thin film circuit substrate can be utilized as a vibration section in a speaker device. Also, in a display device, the thin film circuit substrate makes it possible to integrate a display-section drive circuit into the same substrate that constitutes a display section. This realizes a small, lightweight, thin device, simplifies a manufacturing process, and improves connection reliability.

Meanwhile, Japanese Laid-Open Patent Application No. 50937/1998 (Tokukaihei 10-50937; published on Feb. 20, 1998) (Document 2) describes an arrangement in which an antistatic diode is monolithically provided in a general semiconductor integrated circuit.

However, in a piezoelectric speaker device and a display device which include a conventional drive circuit constituted of a thin film circuit substrate, as well as in the arrangement described in Document 1, no measures are taken against a surge voltage and current.

Therefore, a conventional piezoelectric speaker device using a reverse piezoelectric effect to convert an electrical signal into a stress vibration conducting vibration to air, generates an electromotive force from a positive piezoelectric effect of a piezoelectric element upon receipt of a strong shock caused by an accidental drop. The electromotive force applies an excess voltage (surge voltage) reversely to the voice output section. The surge voltage generates a current (surge current), which may be conducted backward in a route. This might cause damage to the voice-output-section drive circuit on the thin film circuit substrate. Also, in a device having a connection terminal connected to an external device, such as a display device, when a user touches with his/her finger the connection terminal, provided externally to the device, for receiving a video signal from the external device, a surge voltage and a surge current induced from static electricity may be generated. This might cause damage to the display-section drive circuit.

Conventionally, such measures have not been taken for the following reason. As described in Document 2, a general semiconductor integrated circuit can be monolithically provided with an antistatic diode so as to take measures against electrostatic damage. However, since the thin film circuit substrate, presupposed by the present invention, which constitutes a drive circuit of a thin film layer, uses not a bonded-type but a MOS-FET thin film, PN bonding becomes difficult. Therefore, under the existing circumstances, it is impossible to monolithically form an antistatic diode having a predetermined performance.

The antisurge section may be externally provided as a separate component. However, an externally provided separate component necessarily enlarges an entire device, undermining the simplification of the manufacturing process and the connection reliability, both of which are realized by the thin film circuit substrate. This makes impossible to utilize the thin film circuit substrate as a vibration section in a speaker device. In addition, since a separate component mounted externally drives up cost, it becomes difficult, in view of a necessity ratio of the cost and protective measures, to take measures against the enlargement of a device and high cost.

SUMMARY OF THE INVENTION

It is an object of the present invention to provide an arrangement of a thin film circuit substrate to which a function of ensuring protection of a circuit section against a surge voltage is monolithically provided. Also, it is another object of the present invention to provide a piezoelectric speaker device, a display device, and a sound-generating display device, formed of the thin film circuit substrate, which are resistant to a surge voltage.

In order to achieve the above objects, a thin film circuit substrate of the present invention is a thin film circuit substrate having an insulative substrate such as a glass substrate and a thin film layer provided on the insulative substrate, the thin film layer having at least part of a circuit section provided thereon, the thin film circuit substrate including: an antisurge element, provided on the insulative substrate and on a wiring between the circuit section and an input terminal section or an output terminal section of the circuit section, for removing excess charges from the wiring when a voltage exceeding a predetermined range is applied to the wiring.

In such an arrangement, an antisurge element, provided on a wiring between a circuit section and an input terminal section thereof or an output terminal section thereof, removes an excess charge from the wiring by bypassing the wiring to the ground when a voltage applied to the wiring exceeds beyond a predetermined range. This makes it possible to protect a drive circuit by preventing damage to the circuit section caused by a current (surge current), generated by an excess voltage (surge voltage), flowing into the circuit section.

Moreover, unlike a protection circuit constituted of a diode, such an antisurge element, arranged to remove excess charges from the wiring, can be easily formed monolithically on the thin film circuit substrate. Therefore, it becomes possible to make an entire device smaller and take antisurge measures at lower cost, as compared with an arrangement in which an antisurge member is provided externally to the thin film circuit substrate.

In order to achieve the above objects, a piezoelectric speaker device of the present invention includes the thin film circuit substrate and a voice output section for outputting a voice according to an audio signal, the voice output section having a vibration section and an excitation source section realized by a piezoelectric element for driving the vibration section according to a drive signal, the circuit section having a voice-output-section driving section for driving the voice output section according to an audio signal.

When the piezoelectric speaker is subjected to a strong shock by a drop or the like, the surge voltage is applied to the voice output section. The surge voltage generates a surge current, and the surge current is passed from the output terminal section in a reverse route. To counter this, the piezoelectric speaker has an antisurge element, so that the surge current is passed through the antisurge element to the ground. Therefore, the voice-output-section driving section on the thin film circuit substrate is prevented from being damaged by the surge voltage, so that a shock-resistant piezoelectric speaker device can be realized.

In order to achieve the above objects, a display device of the present invention includes the thin film circuit substrate and a display section for displaying an image according to a video signal, the circuit section having a display-section driving section for driving the display section according to a video signal.

A surge voltage is applied by an electrostatically charged person who has accidentally touched a connection terminal of the display device. The surge voltage generates a surge current, and the surge current is passed from the input terminal section in a reverse route. To counter this, the display device has an antisurge element, so that the surge current is passed through the antisurge element to the ground. Therefore, the display-section driving section on the thin film circuit substrate is prevented from being damaged by the surge voltage.

In order to achieve the above objects, a sound-generating display device of the present invention is provided with the foregoing thin film circuit substrate, a voice output section for outputting a voice according to an audio signal, and a display section for displaying an image according to a video signal, wherein the thin film circuit substrate constitutes the display section, the voice output section has a vibration section and an excitation source section constituted of a piezoelectric element for driving the vibration section according to a drive signal, the vibration section is the thin film circuit substrate, and the circuit section on the thin film circuit substrate includes a voice-output-section driving section for driving the voice output section according to an audio signal and a display-section driving section for driving the display section according to a video signal.

This makes it possible, as mentioned above, to realize a sound-generating display device which can prevent the voice-output-section driving section and a display-section driving section from being damaged even if the sound-generating display device is accidentally dropped or an electrostatically charged person touches a connection terminal of the sound-generating display device.

For a fuller understanding of the nature and advantages of the invention, reference should be made to the ensuing detailed description taken in conjunction with the accompanying drawings.

DESCRIPTION OF THE EMBODIMENTS

The embodiments of the present invention will be described below in reference to FIGS. 1 to 12.

First Embodiment

Figure 1:
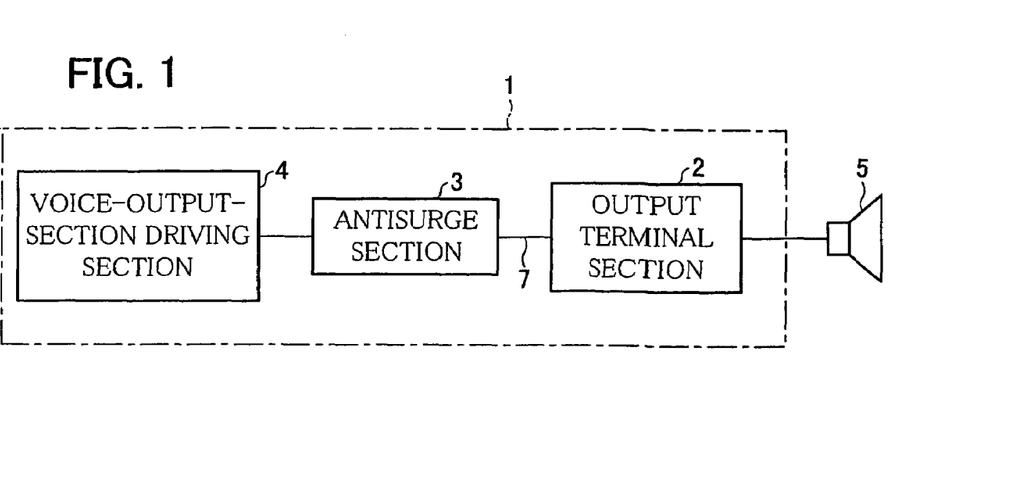
FIG. 1 is a functional block diagram showing a thin film circuit substrate, constituting a drive circuit of a piezoelectric speaker device, according to one embodiment of the present invention.
Figure 2:
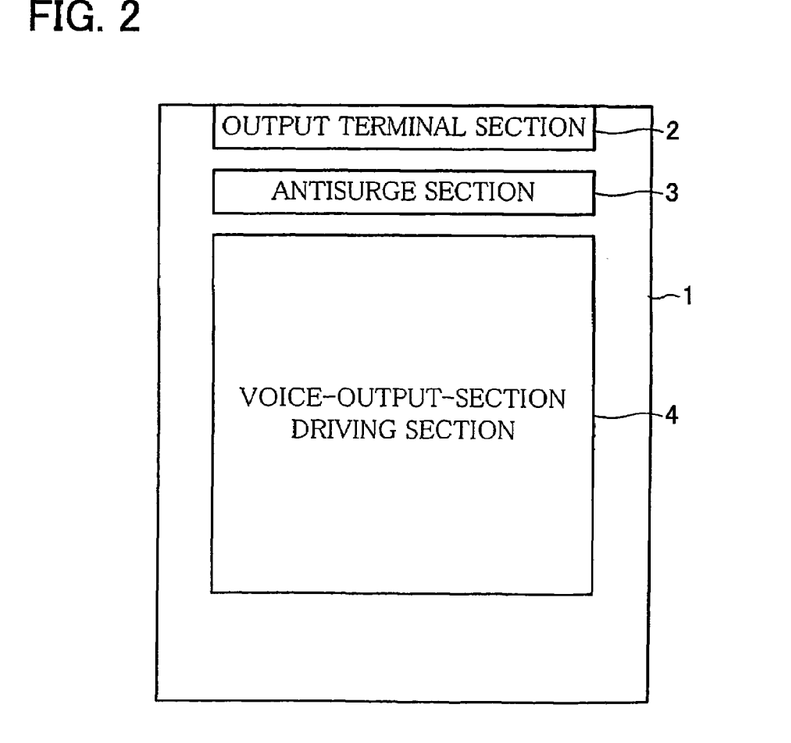
FIG. 2 is a diagram showing a configuration of components on the thin film circuit substrate of FIG. 1.

FIG. 1 is a functional block diagram showing a thin film circuit substrate 1, constituting a drive circuit of a piezoelectric speaker device, according to one embodiment of the present invention. FIG. 2 is a diagram showing a configuration of components on the thin film circuit substrate 1.

As shown in FIGS. 1 and 2, the thin film circuit substrate 1 is provided with an output terminal section 2, an antisurge section 3, and a voice-output-section actuator 4. The thin film circuit substrate 1 includes an insulative substrate (e.g. glass) and a thin film layer, having a polycrystalline silicon thin film, which is formed thereon. The voice-output-section driving section 4 is monolithically formed of the thin film layer. The voice-output-section driving section 4, constituted of a thin film element (e.g. a thin film transistor) formed of the thin film layer, converts an incoming audio signal into an drive signal for driving a voice output section 5, so as to output the drive signal.

The output terminal section 2, serving as a terminal section which outputs a drive signal outputted from the voice-output-section driving section 4, is monolithically formed on the thin film circuit substrate 1. The output terminal section 2 is connected to the voice output section 5 through a flexible substrate or the like (not shown).

The antisurge section 3, provided on a wiring between the voice-output-section driving section 4 and the output terminal section 2, is a part provided with an antisurge element. If a voltage applied to the wiring between the voice-output-section driving section 4 and the output terminal section 2 exceeds a predetermined voltage, i.e. if a surge voltage is applied to the wiring, the antisurge element removes an excess charge from the wiring. The antisurge element, serving as an element for connecting the wiring to the ground so as to conduct to the ground a current (surge current) generated by the surge voltage, is monolithically formed on the thin film circuit substrate 1.

Figure 3:
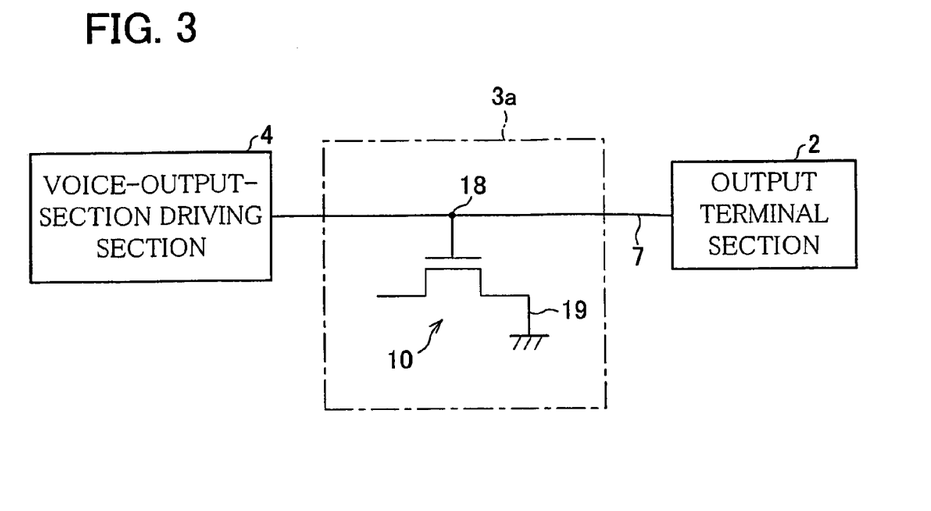
FIG. 3 is a circuit block diagram showing an actual example of an antisurge section formed on the thin film circuit substrate of FIG. 1.
Figure 4:
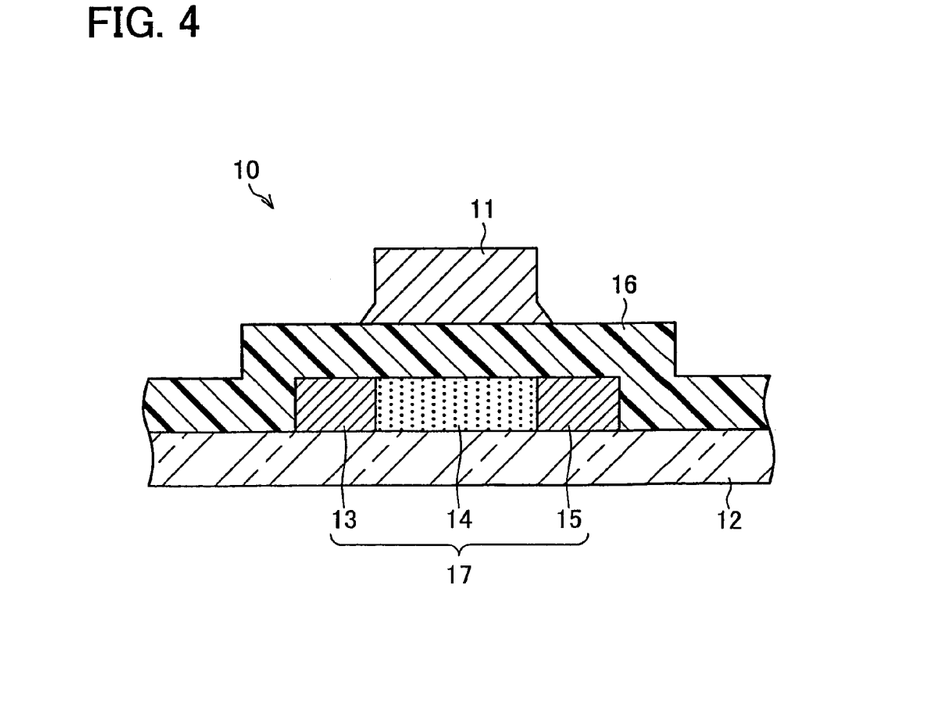
FIG. 4 is a cross-sectional view of an MOS transistor, i.e., an actual example of the antisurge section.

FIGS. 3 and 4 show a concrete example of an antisurge element 3a provided on the antisurge section 3. The antisurge element 3a is constituted of an MOS transistor (first MOS transistor) formed of the same thin film layer as the voice-output-section driving section 4 is formed of.

An MOS transistor 10, as shown in FIG. 3, is arranged such that a gate terminal 18 is connected to a wiring 7 between the voice-output-section driving section 4 and the output terminal section 2, and a source terminal or a drain terminal 19 is connected to the ground.

FIG. 4 is a cross-sectional view of the MOS transistor 10. An element indicated by a reference numeral 12 in FIG. 4 is the insulative substrate of the thin film circuit substrate 1. Provided on the insulative substrate 12 is a semiconductor section 17 formed of the thin film layer. The semiconductor section 17 is divided into a drain/source region 13, a channel region 14, and a drain/source region 15. A gate insulation film 16 is provided so as to cover the semiconductor section 17. A gate electrode 11 is provided on the gate insulation film 16 so as to be opposed to the channel region 14.

Attention should be paid here to a design of the gate insulation film 16. In case of a normal MOS transistor, a gate insulation film is designed to prevent a current from flowing from a gate electrode to a semiconductor section. However, the gate insulation film 16 of the MOS transistor 10 is deliberately designed to allow a current to easily flow from the gate electrode 11 to the semiconductor section 17, with an increase in a voltage applied to the gate electrode 11.

Specifically, as long as a voltage applied to the gate electrode 11 by a voltage which is applied to a load from the wiring 7 lies within a voltage range of a drive signal outputted from the voice-output-section driving section 4, there is substantially no current flowing from the gate electrode 11 to the semiconductor section 17. However, the gate insulation film 16 is designed so that a sharp increase in a voltage applied to the gate electrode 11, accompanied by a sharp increase in a voltage applied to the wiring 7, causes a sharp increase in the amount of a current flowing from the gate electrode 11 to the semiconductor section 17.

Enumerated as a material for the gate insulation film 16 which can realize such a property is tantalum pentoxide or silicon nitride. In addition, since the property of the gate insulation film 16 depends on its film thickness, a material and a thickness are arranged so as to realize the gate insulation film 16 having such a property.

The voice output section 5 outputs a sound corresponding to an audio signal when driven by a drive signal supplied from the voice-output-section driving section 4, and has a vibration section and an excitation source section constituted of a piezoelectric element driving the vibration section according to a drive signal. Furthermore, as will be mentioned later, the vibration section of the voice output section 5 can be made in the form of the thin film circuit substrate 1.

In a piezoelectric speaker device provided with the thin film circuit substrate 1 having such an arrangement, a drive signal based on an audio signal outputted from the voice-output-section driving section 4 is supplied from the output terminal section 2 through the antisurge element 3a of the antisurge section 3 to the voice output section 5, so that the voice output section 5 outputs a sound. Since the MOS transistor 10 constituting the antisurge element 3a has the gate terminal 18 connected to the wiring 7 between the voice-output-section driving section 4 and the output terminal section 2, the MOS transistor 10 is turned on while a voltage of the drive signal is being applied to the gate electrode 11 and the voice-output-section driving section 4 is driving the voice output section 5. However, since the voltage applied to the gate electrode 11 is low, a current flowing from the gate electrode 11 to the semiconductor section 17 is very low.

Meanwhile, if a piezoelectric speaker device is subjected to a strong shock due to dropping or the like, the shock causes a positive piezoelectric effect of a piezoelectric element to generate an electromotive force. The electromotive force causes an extremely high voltage (surge voltage) to be applied reversely to a voice output section, and the surge voltage causes a current (surge current). The surge current flows backward in a path to the thin film circuit substrate 1. However, according to the arrangement in which the thin film circuit substrate 1 is provided with the antisurge section 3, the generated surge current enters the antisurge section 3 first. In the MOS transistor 10 serving as the antisurge element 3a of the antisurge section 3, a high voltage of the surge voltage is applied to the gate electrode 11, thereby causing a sharp increase in the amount of a current flowing from the gate electrode 11 to the semiconductor section 17. The generated surge current is flown from the gate electrode 11 to the ground through the semiconductor section 17.

Therefore, such an arrangement of the thin film circuit substrate 1 does not allow the surge current from the voice output section 5 to enter the voice-output-section driving section 4. Therefore, the voice-output-section driving section 4 can be prevented from being damaged, thus realizing a shock-resistant piezoelectric speaker device.

Moreover, the antisurge element 3a arranged so as to conduct such a surge current to the ground can be monolithically provided on the thin film circuit substrate 1. Therefore, it becomes possible to make an entire device smaller and take antisurge measures at lower cost, as compared with an arrangement in which an antisurge circuit is externally provided to the thin film circuit substrate 1.

In addition, in case of the antisurge element 3a constituted of the MOS transistor 10, the gate insulation film 16, having a special property, requires such steps as film formation and fabrication. However, a thin film layer serving as the semiconductor section 17 and an electrode layer serving as the gate electrode 11 can be realized by using a thin film layer and an electrode layer constituting the voice-output-section driving section 4 and others, thereby making it possible to take antisurge measures at low cost.

Moreover, the gate insulation film 16 of the MOS transistor 10 is a path over which the surge current flows. This arrangement has an advantage that unless the gate insulation film 16 is subjected to dielectric breakdown, the surge current is passed to the ground any number of times, so that the voice-output-section driving section 4 can be repeatedly protected.

In the following, a variation of the antisurge element will be described in reference to FIG. 5. In case of a surge due to a dropping shock to a piezoelectric element such as the voice output section 5, a rebound stress from a direction of the shock may generate a reverse electromotive force. Therefore, it is preferable that the antisurge element be arranged so as to cope with both polarities.

Figure 5:
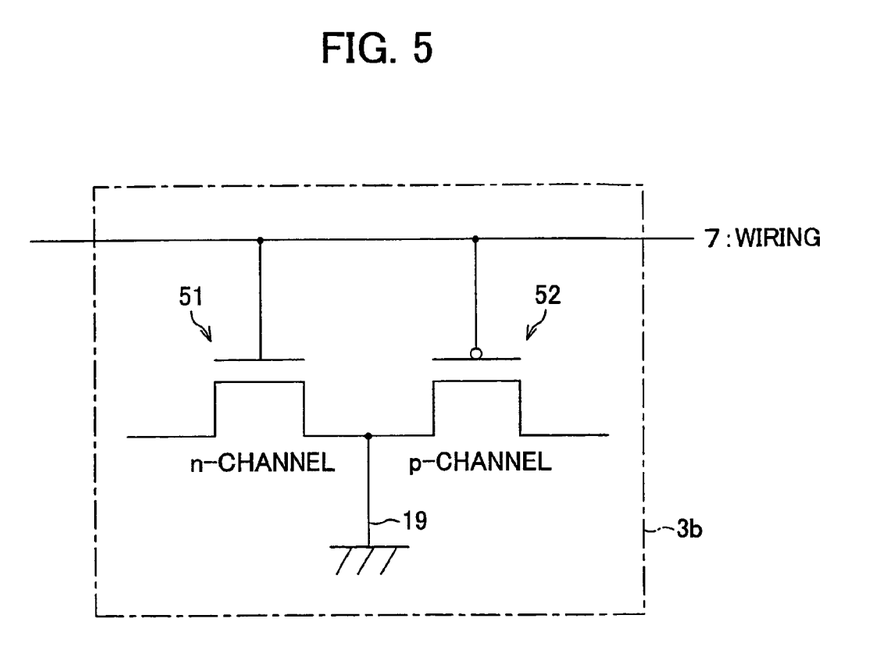
FIG. 5 is a circuit diagram showing another actual example of the antisurge section formed on the thin film circuit substrate of FIG. 1.

Accordingly, an antisurge element 3b in the variation shown in FIG. 5 includes an n-channel MOS transistor 51 and a p-channel MOS transistor 52 connected to each other in a complementary manner. Each gate terminal of the n-channel MOS transistor 51 and the p-channel MOS transistor 52 is connected to the wiring 7 between the voice-output-section driving section 4 (see FIG. 1) and the output terminal section 2 (see FIG. 1). Each source terminal or drain terminal is connected to the ground.

In the antisurge element 3b thus arranged, when a positive surge voltage is applied to the ground, the n-channel MOS transistor 51 operates. Meanwhile, when a negative surge voltage is applied to the ground, the p-channel MOS transistor 52 operates. This makes it possible to cope with a surge of either polarity.

For the purpose of flowing a large amount of surge current and maintaining a sufficient leakage current without causing an insulation film to break down, an antisurge element may require a sufficiently long gate length. Accordingly, it is possible to provide an antisurge element with a high Cgd (gate-drain capacity). Also, a short circuit effect due to capacitive coupling can be used together.

Second Embodiment

In the following, a thin film circuit substrate according to another embodiment of the present invention will be described in reference to FIG. 6. The thin film circuit substrate is a thin film circuit substrate which constitutes a drive circuit of a piezoelectric speaker device, and is different only in an arrangement of an antisurge element from the thin film circuit substrate according to the First Embodiment. Therefore, only the arrangement of the antisurge element is described here.

Figure 6:
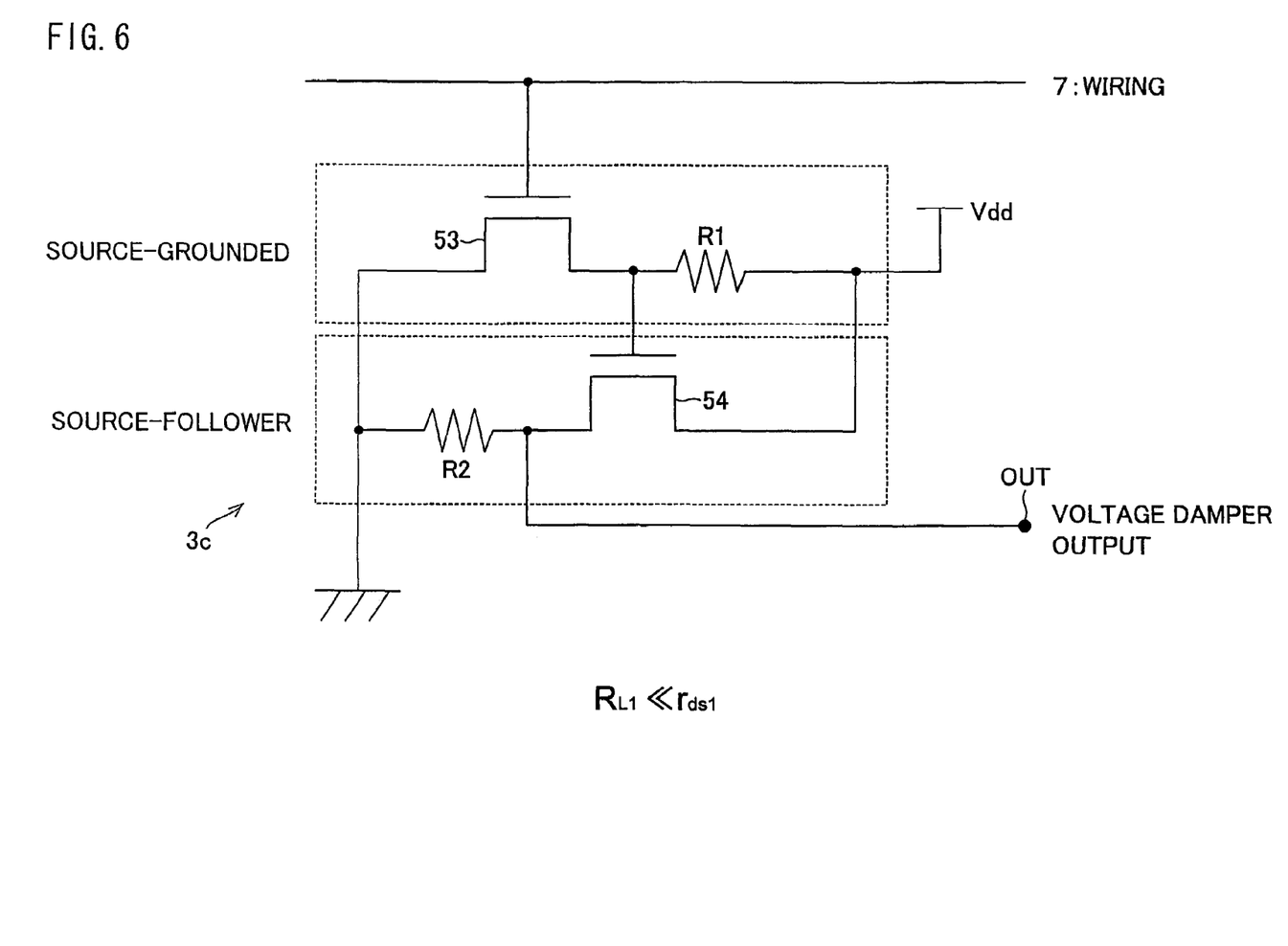
FIG. 6 is a circuit diagram showing an actual example of an antisurge section formed a thin film circuit substrate, constituting a drive circuit of a piezoelectric speaker device, according to another embodiment of the present invention.

When a high-frequency characteristic is not expected judging from a frequency characteristic of a load piezoelectric element serving as a voice output section 5, it is preferable, as shown in FIG. 6, that an antisurge element include a voltage damper utilizing source-grounded operation of a thin film transistor.

An antisurge element 3c shown in FIG. 6 is provided with a source-grounded MOS transistor (second MOS transistor) 53, whose gate terminal is connected to the wiring 7, and a source-follower MOS transistor 54. The gate terminal of the source-grounded MOS transistor 53 is connected to the wiring 7, and a drain terminal of the source-grounded MOS transistor 53 is connected not only to a gate terminal of the source-follower MOS transistor 54 but also to a power supply line applying a bias voltage Vdd through a load resistor R1. The source-follower MOS transistor 54 constitutes a buffer. A drain terminal of the source-follower MOS transistor 54 is connected to the power supply line applying the bias voltage Vdd. A source terminal of the source-follower MOS transistor 54 is not only grounded through a resistor R2 but also connected to an output terminal OUT.

In such an arrangement, the load resistor R1 is set sufficiently low, and the bias voltage Vdd is applied to the drain terminal of the source-grounded MOS transistor 53 so as to perform normal saturation operation in a state where a gain is suppressed. This makes it possible to lower output impedance and at the same time obtain an output of an opposite potential from an MOS transistor 52. The obtained output is supplied to the gate terminal of the MOS source-follower transistor 54, which is connected in a source-follower manner, being capable of further suppressing the output impedance. This is to make it difficult for the obtained output to be affected by a surge voltage which cannot be completely reverse-phase canceled. The obtained output is then taken out as a voltage damper output from the output terminal OUT. The voltage damper output can be utilized to cancel a surge voltage outside of the thin film circuit substrate. Furthermore, apart from the source-follower buffer, a directional coupler element realized by an external transformer or strip line may be used to take out a voltage damper output outside the thin film circuit substrate. In case of an insufficient gain, a gate-grounding transistor (not shown) with a suitable gain may be provided on a previous stage of the source-follower MOS transistor 54.

In this case, in order to dispense a great amount of electric power consumption during a standby, a switch circuit may be added which detects a gate voltage of the source-grounded MOS transistor 53 so as to connect the load resistor R1 to the power supply line of the bias voltage Vdd.

In addition, in case of requiring a high-frequency characteristic and in case of improving a capacity of coping a surge from a larger load piezoelectric element (voice output section 5) by lowering output impedance, the source-grounded MOS transistor 53 can be used as a source-follower MOS transistor and the source-follower MOS transistor 54 can be used as a source-grounded MOS transistor.

When the antisurge element 3c realized by such a voltage damper is not expected to completely cancel a surge by itself judging from a limitation of the bias voltage Vdd, the antisurge elements 3a and 3b utilizing a leakage current, shown in FIGS. 3 and 5 and mentioned in the First Embodiment, can be used simultaneously, thereby further enhancing a protection effect.

Moreover, the MOS transistor 10, 51, and 52 used for the leakage-current using antisurge elements 3a and 3b can be used also as the source-grounded MOS transistor 53 constituting a voltage damper. That is, the source-grounded MOS transistor 53 may be an MOS transistor having a leakage-current property.

By thus using an MOS transistor as an antisurge element, it becomes possible to form a protection element system adapted to a surge characteristic inferred from a reverse electromotive property of a load under various conditions.

Third Embodiment

Figure 7:
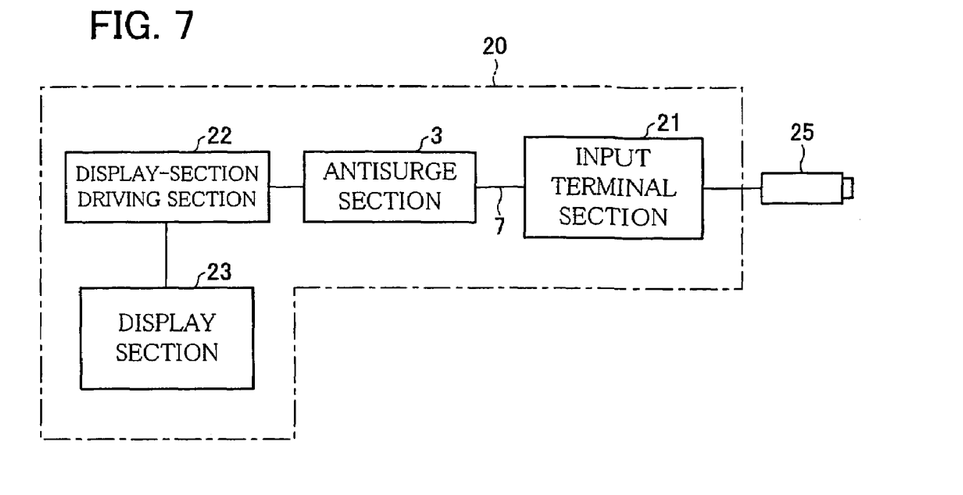
FIG. 7 is a functional block diagram showing a thin film circuit substrate, constituting a drive circuit of a display device, according to a further embodiment of the present invention.
Figure 8:
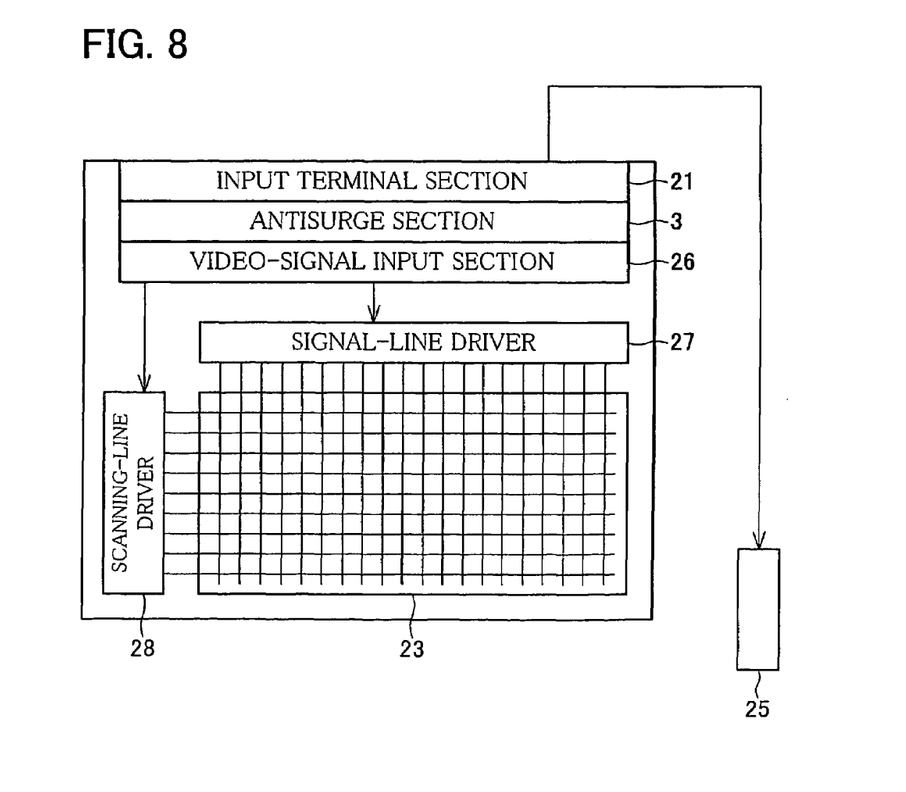
FIG. 8 is a diagram showing a configuration of components on the thin film circuit substrate of FIG. 7.

In the following, a thin film circuit substrate 20, constituting a drive circuit of a display device, according to a further embodiment of the present invention will be described in reference to FIGS. 7 and 8. FIG. 7 is a functional block diagram showing an arrangement of the thin film circuit substrate 20. FIG. 8 is a diagram showing a configuration of components on the thin film circuit substrate 20. It is to be noted, for the sake of convenience in description, that the same reference mark is appended to a component having the same function as in the First Embodiment. Description of the component is omitted.

As shown in FIGS. 7 and 8, the thin film circuit substrate 20 is provided with a display driving section (display driving circuit) 22, a display section 23, an antisurge section 3, and an input terminal section 21. The display driving section 22 is constituted of a video-signal input section 26, a signal-line driver 27, and a scanning-line driver 28. The thin film circuit substrate 20, constituting the display section 23 as well, includes an insulative substrate (e.g., glass) and a thin film layer, having a polycrystalline silicon thin film, which is formed thereon. The thin film layer is used to form a pixel-driving element in the display section 23. The display section actuator 22 is monolithically formed around the display section 23.

The input terminal section 21 is a terminal section to which a video signal to be inputted to the display section actuator 22 is fed from an external device. The input terminal section 21 is monolithically formed on the thin film circuit substrate 20. Connected to the input terminal section 21 is a video-signal connection terminal 25 for electrically connecting the display device to the external device which serving as a device which outputs a video signal.

As described above, the display section actuator 22 is constituted of the video-signal input section 26, the signal-line driver 27, and the scanning-line driver 28. However, each component of the display section actuator 22 is realized by a thin film element such as a thin film transistor formed of a thin film layer. In the display section actuator 22, the video-signal input section 26 receives a video signal which has been inputted from the input terminal section 21. The video signal is transmitted to the signal-line driver 27 and the scanning-line driver 28 after a predetermined processing. The signal-line driver 27 and the scanning-line driver 28 output a drive signal. As a result, the display section 23 displays an image according to the video signal.

As is the case with the thin film circuit substrate 1, the antisurge section 3 including an antisurge element 3a, an antisurge element 3b, or an antisurge element 3c, is monolithically formed between the display section actuator 22 and the input terminal section 21.

Therefore, even if a surge current occurs due to application of a surge voltage, which has been generated by a touch of an electrostatically charged person or the like, to the video-signal connection terminal 25, the surge current is passed through the antisurge section 3 to the ground, or excess charges are removed from the wiring with cancellation by an output of an opposite potential. This prevents the surge voltage from damaging the display section actuator 22 on the thin film circuit substrate 20, thereby realizing a highly antistatic display device.

The display section 23 only needs to be a display element which can be driven by a thin film element made of the thin film circuit substrate 20. The display section 23 may use display methods such as a liquid-crystal display method (reflection/transmission), an EL (electro luminescence) element method, a method of making a display by changing a state of diffusion or scattering of an incoming light beam under control of pixels in operation by using a piezoelectric element, a micromachine, or the like, and an FED (field emission display) method.

Furthermore, in each of the embodiments described above, a thin film layer formed on an insulative substrate on the thin film circuit substrate 1 or 20 is described as a thin film layer including a polycrystalline silicon thin film. However, the polycrystalline silicon thin film herein referred to also includes a silicon thin film of a continuous grain-boundary crystal, as described in Nikkei Electronics (Feb. 17, 2003) p. 123-130.

In addition, in each of the embodiments described above, the voice-output-section driving section 4 or the display section actuator 22 is monolithically formed of a thin film layer formed on an insulative substrate. However, the voice-output-section driving section 4 or the display section actuator 22 may be formed on the insulative substrate by using a technique of bonding an active element, formed on a separate substrate, to the insulative substrate. Particularly, in bonding the active element, formed on the separate substrate, to the insulative substrate, it is preferable that a hydrogen ion peeling method be used for bonding. In the hydrogen ion peeling method, the separate substrate having a hydrogen ion injection section and including the active element is bonded to the insulative substrate, and the separate substrate is heat-treated.

There is a method of bonding using an adhesive agent in forming an active element on a separate substrate and bonding the active element to an insulative substrate. However, this method suffers from drawbacks that it requires troublesome pasting work and that the adhesive agent has a problem with its heat resistance, so that only a limited number of steps can be performed after bonding the active element. On the contrary, since the hydrogen ion peeling method dispenses an adhesive agent, there will never be such drawbacks.

In the following, an example is described in which an MOS monocrystal silicon thin film transistor is bonded using the hydrogen ion peeling method. Provided on a surface of a monocrystal silicon substrate serving as a substrate to be bonded are an oxidized film, forming a portion of the MOS monocrystal silicon thin film transistor, a gate pattern, and an impurity-ion injection section. Provided at a predetermined depth from the surface is a hydrogen ion injection section. Such a monocrystal silicon substrate is bonded to an insulative substrate on the side of the oxidized film and is heat-treated. The heat treatment changes the bonding of the two substrates into an atomic bond, which causes a strong bonding. The heat treatment also causes cleavage exfoliation in the hydrogen ion injection section, thereby removing an unnecessary portion on the monocrystal silicon substrate. This makes it possible to easily bond an MOS monocrystal silicon thin film transistor onto an insulative substrate even without using an adhesive agent.

Fourth Embodiment

In the following, a thin film circuit substrate 30, constituting a drive circuit of a sound-generating display device, according to a further embodiment of the present invention is described in reference to FIG. 9. It is to be noted, for the sake of convenience in description, that the same reference mark is appended to a component having the same function as in the First and Second Embodiments. Description of the component is omitted.

Figure 9:
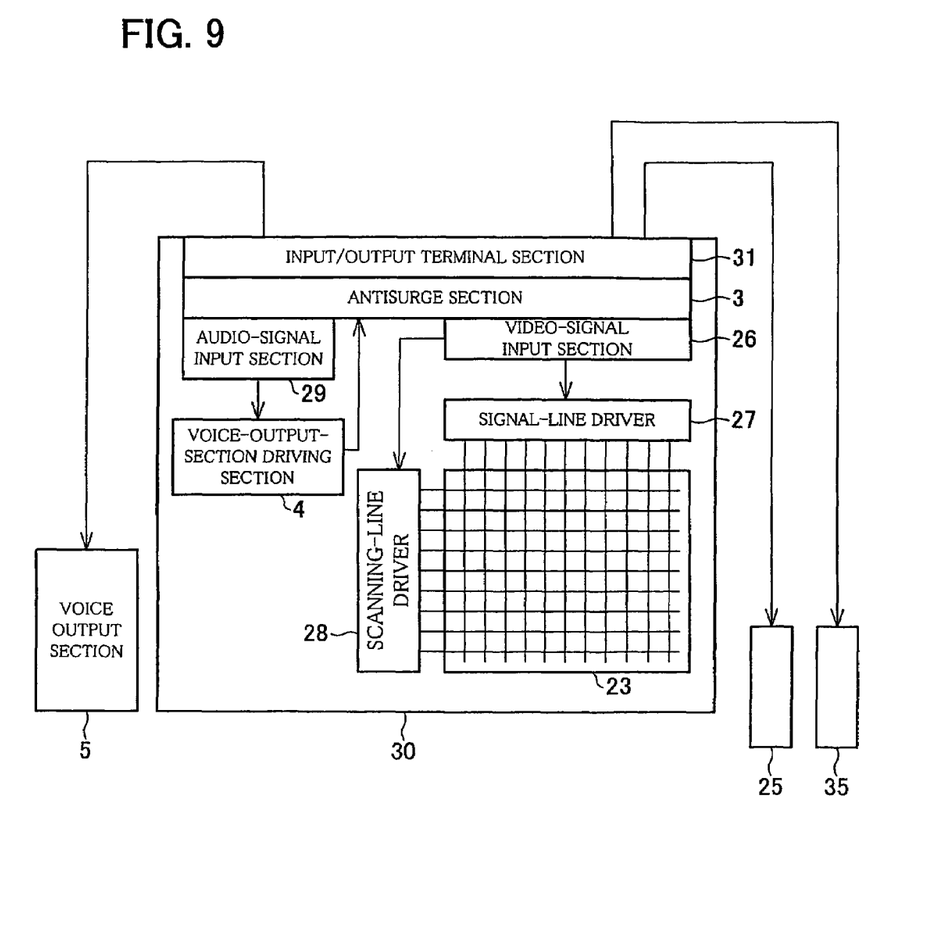
FIG. 9 is a diagram showing a configuration of components on a thin film circuit substrate, constituting a drive circuit of a sound-generating display device, according to a further embodiment of the present invention.

FIG. 9 is a diagram showing a configuration of components on a thin film circuit substrate 30 contained in a sound-generating display device, according to the present embodiment.

As shown in FIG. 9, an input/output terminal section 31 is not only a terminal section to which a video signal and/or an audio signal is inputted from an external device but also a terminal section from which a drive signal for driving the voice output section 5 is outputted. An audio-signal input terminal 29 receives audio signals inputted from various external devices. In addition, an audio-signal connection terminal 35 is provided so as to electrically connect a sound-generating display device of the present invention to an external device serving as a device which outputs an audio signal.

The antisurge section 3 is provided between the input/output terminal section 31 and the display section actuator 22 including the video-signal input section 26 and others. The antisurge section 3 is provided also between the input/output terminal section 31 and the audio-signal input section 29 and between the input/output terminal section 31 and the voice-output-section driving section 4.

Therefore, even if a surge current, which has been generated in the video-signal connection terminal 25 by a touch of an electrostatically charged person or the like, enters the thin film circuit substrate 30 from the video-signal connection terminal 25 through the input/output terminal section 31, the antisurge section 3 passes the surge current to the ground. Therefore, the surge current can be prevented from damaging the display section actuator 22.

Similarly, even if a surge current, which has been generated in the audio-signal connection terminal 35 by a touch of an electrostatically charged person or the like, enters the thin film circuit substrate 30 from the audio-signal connection terminal 35 through the input/output terminal section 31, the antisurge section 3 passes the surge current to the ground. Therefore, the surge current can be prevented from damaging the audio-signal input terminal 29 and the voice-output-section driving section 4.

Moreover, even if a surge current, which has been generated in the voice output section 5 by dropping of the sound-generating display device, enters inside of the thin film circuit substrate 30 through the input/output terminal section 31, the antisurge section 3 conducts the surge current to the ground. Therefore, the surge current can be prevented from damaging the audio-signal input terminal 29 and the voice-output-section driving section 4.

In the following, a sound-generating display device provided with the thin film circuit substrate 30 will be described in reference to FIGS. 10 to 12. However, an arrangement is here shown in which the input/output terminal section 31, connected neither to the video-signal connection terminal 25 nor to the audio-signal connection terminal 35, is connected to an external device through a flexible printed circuit (hereinafter referred to as an FPC) 45.

Figure 10:
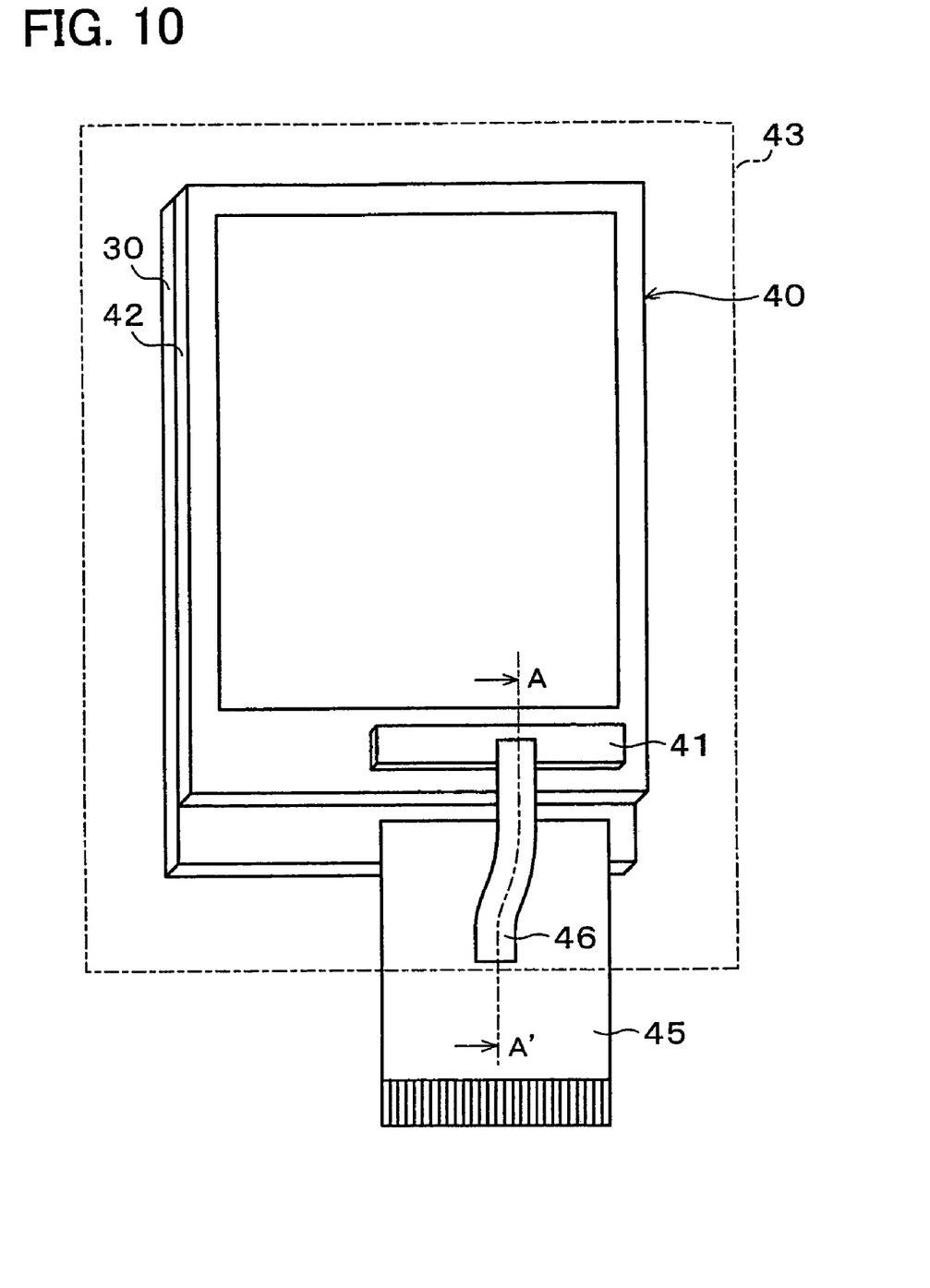
FIG. 10 is a perspective view of an arrangement of a sound-generating display device equipped with the thin film circuit substrate of FIG. 9.

FIG. 10 is a perspective view of an arrangement of a sound-generating display device. FIG. 11 is a cross-sectional view taken along the line A-A' in FIG. 10. FIG. 12 is an outline view of the sound-generating display device.

As shown in FIG. 10, the sound-generating display device is provided with a liquid crystal panel 40 and an audio device 41. The liquid crystal panel 40, constituting a display section 23, serves as a vibration section of a voice output section 5. The audio device 41 serves as an excitation source section for vibrating a vibration section of the voice output section 5.

In the liquid crystal panel 40, the thin film circuit substrate 30 and the counter substrate 42 are disposed opposed to each other so as to sandwich a liquid crystal layer. The audio device 41, as shown in FIG. 12, is accommodated in a bezel 43 serving as a housing of the sound-generating display device. The bezel 43 not only covers a back of the liquid crystal panel 40 but also has an opening in a portion corresponding to a display area which contributes to a display.

It is to be noted here that the audio device 41 is disposed on the display side of the liquid crystal panel 40 so as to be located on a periphery of the display area on the liquid crystal panel 40. The periphery is equivalent to a frame portion in the sound-generating display device covered by the bezel 43. As long as the audio device 41 is so located, the audio device 41 may be fixed onto either the liquid crystal panel 40 or the bezel 43.

Furthermore, as will be mentioned later, it is also possible to dispose the audio device 41 on the back side of the liquid crystal panel 40, which is the back side of the sound-generating display device. In such a case as a reflection liquid crystal, the audio device 41 does not need to be disposed on a periphery. Instead, the audio device 41 only needs to be disposed laminated on a liquid crystal panel so as to fit in a plane domain of the liquid crystal panel.

Meanwhile, in order to dispose the audio device 41 on a periphery without enlarging the periphery, the audio device 41 needs to be thin, small, and slim. If the liquid crystal panel 40 is a reflection liquid crystal and the audio device 41 is disposed on the back of the liquid crystal panel 40, the audio device 41 does not need to be as thin, small, and slim as in a case where the audio device 41 is disposed on the peripheral portion of a surface. Nevertheless, in order to ensure a mount space for another function element, it is desired that the audio device 41 be thin, small, and slim.

In addition, the audio device 41 is constituted of a piezoelectric element formed of a Rochelle-salt crystal or a ceramic thin plate. However, a voice-output-section driving section for driving the audio device 41 and an audio-system circuit such as an audio-signal input section are constituted of a semiconductor element or the like. Therefore, the audio-system circuit, which cannot be made together with the audio device 41, needs to be separately made by using a printed circuit substrate or the like. However, it is unsuitable in terms of size to make an audio-system circuit by using a separate printed circuit substrate so as to incorporate the resulting audio-system circuit into a liquid crystal module.

Accordingly, in the present embodiment, as described above, the thin film circuit substrate 30 has the voice-output-section driving section 4 and others integrated thereinto. By thus forming the audio-system circuit on the thin film circuit substrate 30 of the liquid crystal panel 40, it becomes unnecessary to incorporate the printed circuit substrate, constituting the audio-system circuit, into the sound-generating display device. This allows the audio device 41 to be made thin, small, and slim and to be disposed on the frame portion of the sound-generating display device without any problems. In addition, it is possible to cut costs to the extent that a separate substrate is not required.

In addition, in the present embodiment, the FPC 45 having flexibility, which is connected to the input/output terminal section 31 of the thin film circuit substrate 30, is shared so as to input both a video signal and an audio signal into the thin film circuit substrate 30. Therefore, a component count and the number of connection steps can be reduced, compared with an arrangement in which two respective FPCs for a video signal and an audio signal are connected to the thin film circuit substrate 30. This also makes it possible to cut costs.

Moreover, in the present embodiment, the following device is elaborated in respect to a connection between the audio device 41, disposed so as to be laminated on the liquid crystal panel 40, and the voice-output-section driving section 4, formed on the thin film circuit substrate 30 of the liquid crystal panel 40.

Figure 11:
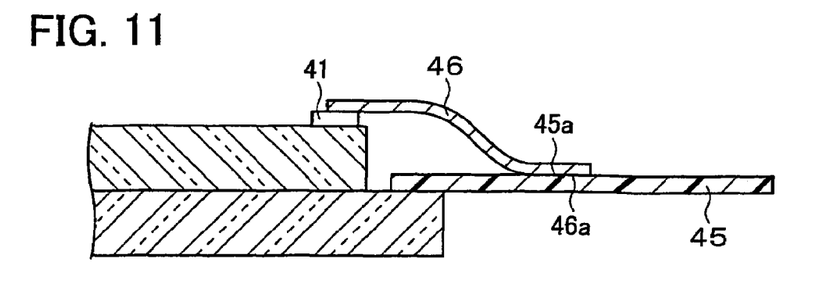
FIG. 11 is a cross-sectional view taken along the line A-A' in FIG. 10.
Figure 12:
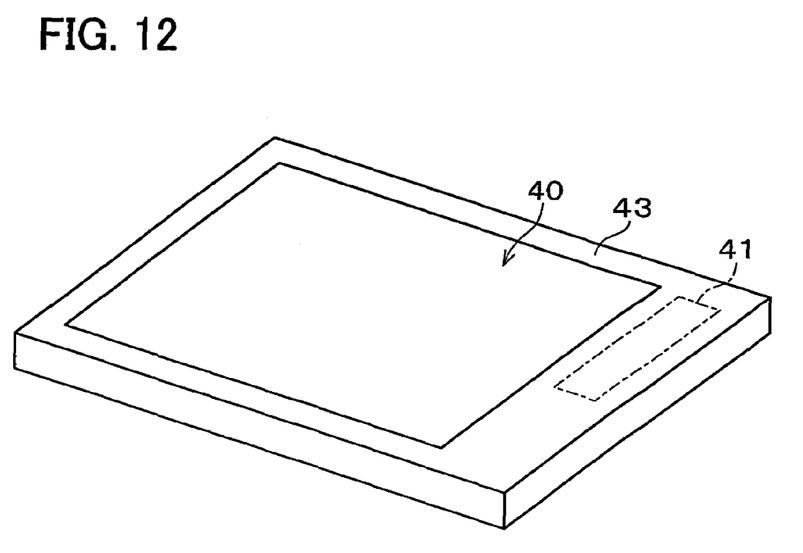
FIG. 12 is an outline view of the sound-generating display device.

That is, a connection between the voice-output-section driving section 4, formed on the side of the thin film circuit substrate 30, and the audio device 41, disposed so as to be laminated on the thin film circuit substrate 30, as shown in detail in FIG. 11, is used to connect the FPC 45, connected to the thin film circuit substrate 30, which receives a video signal and an audio signal. The FPC 45 is provided with a wiring (not shown) for taking out a signal outputted from the voice-output-section driving section 4 and a connection terminal section 45a coupled to the wiring. It is preferable that the connection terminal section 45a be located in a center of the FPC 45 be fit in the bezel 43. Also, the audio device 41 is connected to one end of an FPC 46, the other end of which is provided with a connection terminal section 46a, which is connected to the connection terminal section 45a of the FPC 45 so that the opposing faces are connected (electrically and mechanically) in a lamination manner. A technique such as ACF bonding and soldering is used for connection.

That is, the FPC 45 for connecting the liquid crystal panel 40 to an external device and the FPC 46 for connecting a signal line to the audio device 41 so laminated are provided. One end of the FPC 46 is connected to the audio device 41, and the other end of the FPC 46 is connected to the center of the FPC 45, thereby connecting an audio circuit section on the liquid crystal panel 40 and the audio device 41 through the two FPCs 45 and 46.

In such a connection utilizing the FPC 45, the FPC 46 is not curved in a U shape, thereby not only ensuring a highly reliable connection of the FPC 46 to the audio device 41 and the FPC 45 but also sufficiently shortening a length of the FPC 46. This makes it possible to reduce a portion pushed outside of the liquid crystal panel 40, resulting in a consistency with a technique of narrowing the frame portion. Moreover, the FPC 45 and the FPC 46 are only joined (bonded) to each other for lamination, which realizes easier connection and lower cost as compared with a conventional connection accompanied by curving.

In the following, the above embodiments will be recapitulated.

The thin film circuit substrate is a thin film circuit substrate having an insulative substrate such as a glass substrate and a thin film layer provided on the insulative substrate, the thin film layer having at least part of a circuit section provided thereon, the thin film circuit substrate including: an antisurge element, provided on the insulative substrate and on a wiring between the circuit section and an input terminal section or an output terminal section of the circuit section, for removing excess charges from the wiring when a voltage exceeding a predetermined range is applied to the wiring.

In such an arrangement, an antisurge element, provided on a wiring between a circuit section and an input terminal section thereof or an output terminal section thereof, removes excess charges from the wiring when a voltage applied to the wiring exceeds a predetermined range. This avoids a surge current from flowing into the circuit section, thus preventing the circuit section from being damaged and ensuring a drive circuit to be protected.

Moreover, unlike a protection circuit constituted of a diode, such an antisurge element, arranged to remove excess charges from the wiring, can be easily formed of an MOS transistor or the like monolithically on the thin film circuit substrate. Therefore, it becomes possible to make an entire device smaller and take antisurge measures at lower cost, as compared with an arrangement in which an antisurge member is provided externally to the thin film circuit substrate.

The antisurge element has a first MOS transistor formed of the thin film layer, the first MOS transistor being arranged such that a gate terminal is connected to the wiring, and a source terminal or a drain terminal is grounded, the first MOS transistor having a gate insulation film provided so that the amount of a leakage current flowing from a gate electrode to a channel region sharply increases with increase of a voltage applied to the wiring.

In such an arrangement, when a voltage applied to a gate electrode of the first MOS transistor is raised by a surge voltage, exceeding a signal within a normal voltage range, which is applied to a wiring between the circuit section and the input terminal section or the output terminal section, an insulative force of the gate insulation film sharply decreases, so that the amount of a current flowing from a gate electrode into a channel region sharply increases. This causes the generated surge current to be passed through the gate insulation film to the ground.

In addition, in case of the antisurge element constituted of such an MOS transistor, a special gate insulation film which is highly current conductive requires such steps as film formation and fabrication. However, since a thin film layer serving as the semiconductor section and an electrode layer serving as the gate electrode can be constituted of a thin film layer and an electrode layer constituting the circuit section on the thin film circuit substrate, it is possible to take antisurge measures at low cost.

Moreover, the gate insulation film of the first MOS transistor is a path over which the surge current flows. This arrangement has an advantage that unless an unexpected surge current is generated to subject the gate insulation film to dielectric breakdown, the surge current is passed to the ground any number of times, so that the circuit section can be repeatedly protected.

The special gate insulation film can be made of tantalum pentoxide or silicon nitride, for example. Conventionally, it has been regarded as undesirable to use the material as an insulation film material since an insulation film formed of the material has a property of being easily passing a current. However, by effectively utilizing the property, it becomes possible to realize an antisurge element.

In addition, it is preferable that the antisurge element have voltage damper means, having a source-grounded, second MOS transistor formed of the thin film layer, for outputting a signal of a potential opposite to a potential of the wiring.

According to this arrangement, with the utilization of operation of the source-grounded, second MOS transistor, a signal of a potential opposite to a potential of the wiring is outputted from the second MOS transistor, and this output is taken out as a damper output through a buffer or the like equipped, for example, with a directional coupler and a source-follower or gate-grounded noninverting amplification stage. This makes it possible to cancel a surge voltage outside of the thin film circuit substrate. This is advantageous when a high-frequency characteristic is not expected from a frequency characteristic of a load piezoelectric element.

In this case, the buffer or the like equipped with the directional coupler element and the source-follower or gate-grounded noninverting amplification stage, as well as the source-grounded MOS transistor, is also constituted of the thin film layer and the electrode layer constituting the circuit section on the thin film circuit substrate. Therefore, it is possible to take antisurge measures at low cost.

In addition, it is also preferable that the antisurge element be provided with the voltage damper means in combination with the first MOS transistor.

When it is difficult to cancel a surge voltage with a signal taken out as a damper output alone due to a limitation of a bias voltage, the combination of the voltage damper means with the first MOS transistor, which utilizes a leakage current, complement each other in a protection action, thereby enhancing a protection effect.

Furthermore, in this case, the first MOS transistor, which utilizes a leakage current, and the second MOS transistor in the voltage damper means can be used as one transistor. That is, the first MOS transistor and the second MOS transistor are integrated into a single transistor.

In addition, the thin film layer may include a polycrystalline silicon thin film. Also, the polycrystalline silicon thin film mentioned herein includes a continuous grain-boundary crystal silicon thin film.

In addition to the above arrangement, the thin film circuit substrate of the present invention is arranged so that at least part of the circuit section is provided by bonding an active element formed on a separate substrate to the insulative substrate in such a manner that the separate substrate having a hydrogen ion injection section is bonded to the insulative substrate, and then is heat-treated.

As compared with an arrangement in which a whole circuit section is fabricated with the use of the thin film layer alone, an arrangement in which the active element, formed as part of the circuit section on the separate substrate, is bonded to the insulative substrate enables a smaller thin film circuit substrate in size. In such an arrangement, it is preferable that the active element is bonded to the insulative substrate in such a manner that the separate substrate having a hydrogen ion injection section is bonded to the insulative substrate, and then is heat-treated.

Such a bonding using the hydrogen ion peeling method, which forms such a hydrogen ion injection section for peeling, dispenses troublesome pasting work and excels in productivity, as compared with a method in which a separate substrate including an active element formed thereon is bonded with an adhesive agent. Also, the hydrogen ion peeling method dispenses an adhesive agent. Therefore, without heat resistance of an adhesive agent ever being a problem, an active element formed on a separate substrate can be easily bonded.

In addition, the piezoelectric speaker device includes the thin film circuit substrate and a voice output section for outputting a voice according to an audio signal, the voice output section having a vibration section and an excitation source section realized by a piezoelectric element for driving the vibration section according to a drive signal, the circuit section having a voice-output-section driving section for driving the voice output section according to an audio signal.

Because of this, even if a surge current is passed from the output terminal section in a reverse route, the surge current being generated by a surge voltage applied to the voice output section due to a strong shock to the piezoelectric speaker device caused by a drop or the like, the surge current is passed through the antisurge element to the ground. Therefore, the voice-output-section driving section on the thin film circuit substrate is prevented from being damaged by the surge voltage, so that a shock-resistant piezoelectric speaker device can be realized.

Moreover, since the antisurge element is monolithically formed on the thin film circuit substrate, antisurge measures can be taken without upsizing of an entire device and increase in cost.

In addition, such a piezoelectric speaker device may include the vibration section constituted of the thin film circuit substrate and cause the excitation source section to vibrate the thin film circuit substrate itself so as to generate sound. This makes it possible to realize a smaller, lighter, thinner, and more inexpensive piezoelectric speaker device, as compared with a piezoelectric speaker device having a vibration section separately provided.

The display device includes the thin film circuit substrate and a display section for displaying an image according to a video signal, the circuit section having a display-section driving section for driving the display section according to a video signal.

With this arrangement, even if a surge current is passed from the input terminal section in a reverse route, the surge current being generated by a surge voltage applied by an electrostatically charged person who has accidentally touched a connection terminal of the display device, the surge current is passed through the antisurge element to the ground. Therefore, the display-section driving section on the thin film circuit substrate is prevented from being damaged by the surge voltage.

Moreover, since the antisurge element is monolithically formed on the thin film circuit substrate, antisurge measures can be taken without upsizing of an entire device and increase in cost.

The sound-generating display device is provided with the foregoing thin film circuit substrate, a voice output section for outputting a voice according to an audio signal, and a display section for displaying an image according to a video signal, wherein the thin film circuit substrate constitutes the display section, the voice output section has a vibration section and an excitation source section constituted of a piezoelectric element for driving the vibration section according to a drive signal, the vibration section is the thin film circuit substrate, and the circuit section on the thin film circuit substrate includes a voice-output-section driving section for driving the voice output section according to an audio signal and a display-section driving section for driving the display section according to a video signal.

This makes it possible, as mentioned above, to realize a sound-generating display device which can prevent the voice-output-section driving section and a display-section driving section from being damaged even if the sound-generating display device is accidentally dropped or an electrostatically charged person touches a connection terminal of the sound-generating display device.

The thin film circuit substrate mentioned above can be applied to various devices, including the thin film circuit substrate and a drive circuit formed thereon, which require measures against a surge current, such as a piezoelectric speaker device, a sound-generating display device containing a speaker function using a piezoelectric element, a display device into which a video signal and an audio signal are inputted from an external entity.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A thin film circuit substrate having an insulative substrate and a thin film layer provided on the insulative substrate, the thin film layer having at least part of a circuit section provided thereon, the thin film circuit substrate comprising:

an antisurge element, provided on the insulative substrate and on a wiring between the circuit section and an input terminal section or an output terminal section of the circuit section, for removing excess charges from the wiring when a voltage exceeding a predetermined range is applied to the wiring; wherein
   said antisurge element has a first MOS transistor formed of said thin film layer; and
   the first MOS transistor is arranged such that a gate terminal is connected to the wiring, and a source terminal or a drain terminal is grounded, the first MOS transistor having a gate insulation film provided so that the amount of a leakage current flowing from a gate electrode to a channel region sharply increases with an increase of a voltage applied to the wiring.

2. The thin film circuit substrate according to claim 1, wherein said gate insulation film is made of tantalum pentoxide.

3. The thin film circuit substrate according to claim 1, wherein said gate insulation film is made of silicon nitride.

4. The thin film circuit substrate according to claim 1, wherein said antisurge element has voltage damper means, having a source-grounded, second MOS transistor formed of said thin film layer, for outputting a signal of a potential opposite to a potential of said wiring.

5. The thin film circuit substrate according to claim 1, wherein said thin film layer includes a polycrystalline silicon thin film.

6. The thin film circuit substrate according to claim 1, wherein at least part of said circuit section is provided by bonding an active element formed on a separate substrate to said insulative substrate in such a manner that the separate substrate having a hydrogen ion injection section is bonded to the insulative substrate, and then is heat-treated.

7. The thin film circuit substrate according to claim 1, wherein at least part of said circuit section is provided by bonding an active element formed on a separate substrate to said insulative substrate in such a manner that the separate substrate having a hydrogen ion injection section is bonded to the insulative substrate, and then is heat-treated.

8. The thin film circuit substrate according to claim 2, wherein at least part of said circuit section is provided by bonding an active element formed on a separate substrate to said insulative substrate in such a manner that the separate substrate having a hydrogen ion injection section is bonded to the insulative substrate, and then is heat-treated.

9. The thin film circuit substrate according to claim 3, wherein at least part of said circuit section is provided by bonding an active element formed on a separate substrate to said insulative substrate in such a manner that the separate substrate having a hydrogen ion injection section is bonded to the insulative substrate, and then is heat-treated.

10. The thin film circuit substrate according to claim 4, wherein at least part of said circuit section is provided by bonding an active element formed on a separate substrate to said insulative substrate in such a manner that the separate substrate having a hydrogen ion injection section is bonded to the insulative substrate, and then is heat-treated.

11. The thin film circuit substrate according to claim 5, wherein at least part of said circuit section is provided by bonding an active element formed on a separate substrate to said insulative substrate in such a manner that the separate substrate having a hydrogen ion injection section is bonded to the insulative substrate, and then is heat-treated.

12. The thin film circuit substrate according to claim 1, wherein the first MOS transistor includes an n-channel MOS transistor and a p-channel MOS transistor that are connected to each other in a complementary manner.

13. A thin film circuit substrate having an insulative substrate and a thin film layer provided on the insulative substrate, the thin film layer having at least part of a circuit section provided thereon, the thin film circuit substrate comprising:

an antisurge element, provided on the insulative substrate and on a wiring between the circuit section and an input terminal section or an output terminal section of the circuit section, for removing excess charges from the wiring when a voltage exceeding a predetermined range is applied to the wiring; wherein said antisurge element includes a source-grounded, first MOS transistor and a source-follower second MOS transistor, a gate terminal of the first MOS transistor is connected to said wiring, a drain terminal of the first MOS transistor is connected to a gate terminal of the second MOS transistor, a bias voltage is applied on the drain terminal of the first MOS transistor through a load resistor, the bias voltage is applied on a drain terminal of the second MOS transistor, and a source terminal of the second MOS transistor is grounded through a resistor and is connected to an output terminal for outputting the signal.

14. The thin film circuit substrate according to claim 13, wherein said first MOS transistor and said second MOS transistor are used as one transistor in said antisurge element.

15. The thin film circuit substrate according to claim 13, wherein at least part of said circuit section is provided by bonding an active element formed on a separate substrate to said insulative substrate in such a manner that the separate substrate having a hydrogen ion injection section is bonded to the insulative substrate, and then is heat-treated.

16. The thin film circuit substrate according to claim 14, wherein at least part of said circuit section is provided by bonding an active element formed on a separate substrate to said insulative substrate in such a manner that the separate substrate having a hydrogen ion injection section is bonded to the insulative substrate, and then is heat-treated.

17. A piezoelectric speaker device, comprising:
(a) a thin film circuit substrate having an insulative substrate and a thin film layer provided on the insulative substrate, the thin film layer having at least part of a circuit section provided thereon, the thin film circuit substrate including: an antisurge element, provided on the insulative substrate and on a wiring between the circuit section and an input terminal section or an output terminal section of the circuit section, for removing excess charges from the wiring when a voltage exceeding a predetermined range is applied to the wiring; and
(b) a voice output section for outputting a voice according to an audio signal, the voice output section having a vibration section and an excitation source section realized by a piezoelectric element for driving the vibration section according to a drive signal; wherein the circuit section has a voice-output-section driving section for driving said voice output section according to an audio signal;

said antisurge element has a first MOS transistor formed of said thin film layer; and the first MOS transistor is arranged such that a gate terminal is connected to the wiring, and a source terminal or a drain terminal is grounded, the first MOS transistor having a gate insulation film provided so that the amount of a leakage current flowing from a gate electrode to a channel region sharply increases with an increase of a voltage applied to the wiring.

18. The piezoelectric speaker device according to claim 17, wherein the vibration section is the thin film circuit substrate, and the excitation source section vibrates the thin film circuit substrate for voice output.

19. A display device, comprising:
(a) a thin film circuit substrate having an insulative substrate and a thin film layer provided on the insulative substrate, the thin film layer having at least part of a circuit section provided thereon, the thin film circuit substrate including: an antisurge element, provided on the insulative substrate and on a wiring between the circuit section and an input terminal section or an output terminal section of the circuit section, for removing excess charges from the wiring when a voltage exceeding a predetermined range is applied to the wiring; and (b) a display section for displaying an image according to a video signal; wherein the circuit section has a display-section driving section for driving said display section according to a video signal;

said antisurge element has a first MOS transistor formed of said thin film layer; and the first MOS transistor is arranged such that a gate terminal is connected to the wiring, and a source terminal or a drain terminal is grounded, the first MOS transistor having a gate insulation film provided so that the amount of a leakage current flowing from a gate electrode to a channel region sharply increases with an increase of a voltage applied to the wiring.

20. A sound-generating display device, comprising:

(a) a thin film circuit substrate having an insulative substrate and a thin film layer provided on the insulative substrate, the thin film layer having at least part of a circuit section provided thereon, the thin film circuit substrate including: an antisurge element, provided on the insulative substrate and on a wiring between the circuit section and an input terminal section or an output terminal section of the circuit section, for removing excess charges from the wiring when a voltage exceeding a predetermined range is applied to the wiring;

(b) a voice output section for outputting a voice according to an audio signal, the voice output section having a vibration section and an excitation source section realized by a piezoelectric element for driving the vibration section according to a drive signal; and (c) a display section, provided on said thin film circuit substrate, for displaying an image according to a video signal; wherein said circuit section has (i) a voice-output-section driving section for driving said voice output section according to an audio signal and (ii) a display-section driving section for driving said display section according to a video signal;

said antisurge element has a first MOS transistor formed of said thin film layer; and the first MOS transistor is arranged such that a gate terminal is connected to the wiring, and a source terminal or a drain terminal is grounded, the first MOS transistor having a gate insulation film provided so that the amount of a leakage current flowing from a gate electrode to a channel region sharply increases with an increase of a voltage applied to the wiring.

* * * * *